C. P. FUNK.
DRAIN TILE.
APPLICATION FILED SEPT. 29, 1920.
1,406,182.
Patented Feb. 14, 1922.
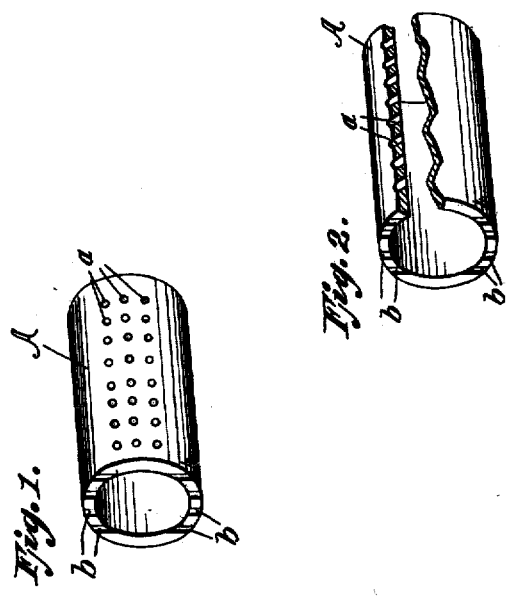

UNITED STATES PATENT OFFICE.

CAPTAIN PERRY FUNK, OF WOOSTER, OHIO.

DRAIN TILE.

1,406,182.                Specification of Letters Patent.    Patented Feb. 14, 1922.

Application filed September 29, 1920. Serial No. 413,631.

*To all whom it may concern:*

Be it known that I, CAPTAIN PERRY FUNK, a citizen of the United States, residing at Wooster, in the county of Wayne and State of Ohio, have invented a new and useful Drain Tile, of which the following is a specification.

My invention relates to improvements in drain tile, and its objects are, first, to provide a drain tile made of any suitable plastic material, so constructed as to afford better drainage facility than heretofore; second, to so construct perforations through the tile wall as to provide better facilities for the ingress of water, and at the same time prevent the ingress of silt or other foreign matter into the drainage channel of the tile; third, to provide a simpler method of construction whereby the meeting ends of the tile afford better drainage capacity.

It consists, primarily in the novel method of perforating the body of the tile with numerous small orifices running diagonally to the longitudinal center of the tile, parallel to each other, and indenting one end of each tile with a series of furrows cross wise, to abut against the smooth end of the next adjacent tile, one end of each being left smooth for this purpose—whereby the manufacture is cheapened, and the tile made more efficient for drainage purposes.

My invention is illustrated by the accompanying drawings, wherein Fig. 1 is a view in perspective of a tile embodying my invention; and Fig. 2 is a longitudinal sectional view showing the diagonal perforations and the furrows at one end of the tile.

In the drawings, A is the tile wall or body, and $a$, $a$ are perforations therethrough, and $b$, $b$ are furrows indented directly across one end of the tile body. The principal object of said perforations is to afford ample opportunity for the water in the soil to enter the tile, and, at the same time, prevent the entrance of any soil material likely to clog the apertures or fill up the channel of the tile.

I am aware it is not new to construct tile having perforations through the wall thereof, and that tile have heretofore been made with projections and furrows at the meeting ends thereof, and such I do not broadly claim. I am also aware that crock tiles for irrigation purposes have been set endwise in the soil and provided with diagonal perforations in radial directions through the wall, the upper end of such tile being provided with a cover; and that supply pipes connected with a water source for irrigating soil have been laid underground, having a series of perforated branch pipes leading therefrom, provided with cut offs, etc., and such I do not claim. Experiment has demonstrated the necessity of so perforating the body of drain tile as to take water from the soil freely without at the same time admitting soil debris to such an extent as to very soon clog the apertures and fill up the tile channel; and attempts have heretofore been made to accomplish such drainage by making a few enlarged perforations through the tile wall, and protecting the inlets by overhanging flanges, and by aiding the flow of water thereto by means of logitudinal channels connecting such apertures; but such construction has been too expensive for profitable manufacture, and, moreover, it has been found to be impossible to make numerous small perforations through the body of plastic material at right angles therewith, unless internally supported to prevent collapse of such plastic material by the external pressure required to puncture the same, and also that such perforations must be made diagonally in the direction of the flow of water in order to be kept open and unobstructed; and I have discovered that such diagonal perforations accomplish better drainage when made parallel to each other, laterally, instead of running in a radial direction, as used in irrigating and fertilizing soils heretofore, because, when the punctures are quite small, and numerous, a radial direction brings the inlet ends of the punctures too close together, and, when separated a short distance from each other, they could not be made by machinery; and water would have to rise to a higher level about the tile to gain access to the openings to radial perforations. I overcome these defects by means of longitudinal rows of perforations, all running diagonally through the wall and parallel to each other in said diagonal direction, whereby the water arising about the tile finds entrance to the tile channel at a lower level, and more freely than is otherwise possible; and by so constructing them, the perforations can be quickly made by suitable machinery whereby the several parallel longitudinal rows of perforations may be punctured simultaneously while the tile is in a plastic condition and moving from the tile press in the manner set forth in my divisional application, Serial No. 463,644, filed April 22, 1921.

I also provide adequate openings for the ingress of water at the meeting ends of the tile, by constructing a plurality of notches across one end of each tile, leaving the other end smooth, whereby the endwise movement of the tile cannot close up such openings, and water about the tile may find entrance from all directions. I am aware that the construction of grooves across both ends of the tile have been heretofore used, and such I do not broadly claim but limit my claim to the junction of a smooth end with one that is notched, in combination with the rows of diagonal perforations parallel to each other, as aforesaid. The method I employ to construct the end notches is made the subject of my said divisional application.

Having thus fully described my invention herein set forth, what I claim as new and desire to secure by Letters Patent is—

A drain tile of plastic material having a plurality of rows of perforations through the wall thereof, the said perforations extending diagonally in the direction of the length of the tile and being parallel to each other both laterally and longitudinally, the said tile also having one end smooth and the other end formed with a plurality of notches therein.

In witness whereof, I hereunto set my hand this 5 day of May, 1920.

CAPTAIN PERRY FUNK.

In presence of two witnesses:
HIRAM B. SWARTZ,
MAHLON ROUCH.